United States Patent
Zhu et al.

(10) Patent No.: US 9,585,161 B2
(45) Date of Patent: Feb. 28, 2017

(54) METHOD AND ARRANGEMENT FOR ACQUIRING SCHEDULING INFORMATION

(75) Inventors: Huaisong Zhu, Sundbyberg (SE); Yu Yang, Solna (SE); LuSheng Yu, Täby (SE); Jinliang Huang, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 76 days.

(21) Appl. No.: 14/417,363

(22) PCT Filed: Aug. 1, 2012

(86) PCT No.: PCT/CN2012/079464
§ 371 (c)(1),
(2), (4) Date: Jan. 26, 2015

(87) PCT Pub. No.: WO2014/019155
PCT Pub. Date: Feb. 6, 2014

(65) Prior Publication Data
US 2015/0208435 A1    Jul. 23, 2015

(51) Int. Cl.
*H04W 72/12* (2009.01)
*H04L 5/14* (2006.01)
(Continued)

(52) U.S. Cl.
CPC ........... *H04W 72/1268* (2013.01); *H04L 5/14* (2013.01); *H04W 72/042* (2013.01); *H04W 72/1289* (2013.01); *H04W 92/20* (2013.01)

(58) Field of Classification Search
None
See application file for complete search history.

(56) References Cited

U.S. PATENT DOCUMENTS

| 9,301,292 B2* | 3/2016 | Son ..................... H04W 72/042 |
| 2008/0182525 A1* | 7/2008 | Rofougaran ............. H04B 1/38 455/77 |

(Continued)

FOREIGN PATENT DOCUMENTS

| CN | 102025464 A | 4/2011 |
| CN | 102395163 A | 3/2012 |

(Continued)

OTHER PUBLICATIONS

Berardinelli, Gilberto et al., "Turbo Receivers for Single User MIMO LTE-A Uplink", IEEE 2009, 1-5.

*Primary Examiner* — Brian Roberts
(74) *Attorney, Agent, or Firm* — Murphy, Bilak & Homiller, PLLC (57) ABSTRACT

A method executed in a first radio base station located in a first cell is provided for acquiring scheduling information associated with a second radio base station located in a neighboring cell, where the method comprises listening, via an air interface, to scheduling information transmitted, via a downlink control channel, from the second radio base station; decoding the received scheduling information, and providing the decoded scheduling information to an uplink receiver and/or uplink scheduler associated with the radio base station, such that the uplink receiver and/or uplink scheduler will be able to enhance its performance on the basis of the received scheduling information. An arrangement for executing the suggested method is also provided.

14 Claims, 7 Drawing Sheets

(51) Int. Cl.
*H04W 72/04* (2009.01)
*H04W 92/20* (2009.01)

(56) References Cited

U.S. PATENT DOCUMENTS

| | | | | |
|---|---|---|---|---|
| 2008/0247375 | A1* | 10/2008 | Muharemovic | H04W 72/0426 370/344 |
| 2009/0268684 | A1* | 10/2009 | Lott | H04W 72/087 370/329 |
| 2011/0110325 | A1* | 5/2011 | Kalhan | H04W 72/0426 370/330 |
| 2011/0201341 | A1* | 8/2011 | Choudhury | H04W 72/0426 455/450 |
| 2012/0315956 | A1 | 12/2012 | Mochida et al. | |

FOREIGN PATENT DOCUMENTS

| | | |
|---|---|---|
| WO | 2011055943 A2 | 5/2011 |
| WO | 2011083875 A1 | 7/2011 |
| WO | 2011118242 A1 | 9/2011 |

* cited by examiner

METHOD AND ARRANGEMENT FOR ACQUIRING SCHEDULING INFORMATION

TECHNICAL FIELD

The present document describes a method executed in a cell for acquiring Inter-cell scheduling information from a neighboring cell and an arrangement capable of executing the suggested method.

BACKGROUND

In LTE (Long Term Evolution) system uplink transmission, intra-cell inter-UE (User Equipment) interference will not constitute the main limitation factor for cell average throughput, as well as for cell edge throughput, much thanks to the use of SC-FDMA (Single Carrier Frequency Division Multiple Access).

Accordingly, more and more advance receiver algorithms used for LTE uplink performance have been studied. One such algorithm which does not require any modification to neither the UEs, nor the 3GG specifications is referred to as turbo SIC receiver (Up Link Successive Interference Cancellation), which is to be applied for an UL (Uplink) data channel, such as e.g. PUSCH (Physical Uplink Shared Channel), aiming at removing the inter-cell interference impact on the uplink signals. More information on UL SIC can be found in paper "Turbo Receivers for Single User MIMO LTE-A Uplink" by Gilberto Berardinelli et al, Department of Electronic Systems, Allborg University, Denmark, 2009.

There are further prior art available which focus on improving uplink performance based on scheduling information associated with neighboring cells. Once scheduling information of a neighboring cell has been acquired, it can be used for improving the UL reception in three ways, namely 1) Acquire interference information of the strongest interfering sources and use UL SIC to mitigate these interferences. 2) Improve the accuracy of a noise and interference covariance matrix estimation for some commonly used receiver, such as e.g. a MMSE-IRC (Minimum Means Square Error Interference Rejection Combining) receiver, or 3) Improving the channel estimation accuracy, and hence improve the total receiver performance.

Figure 1:
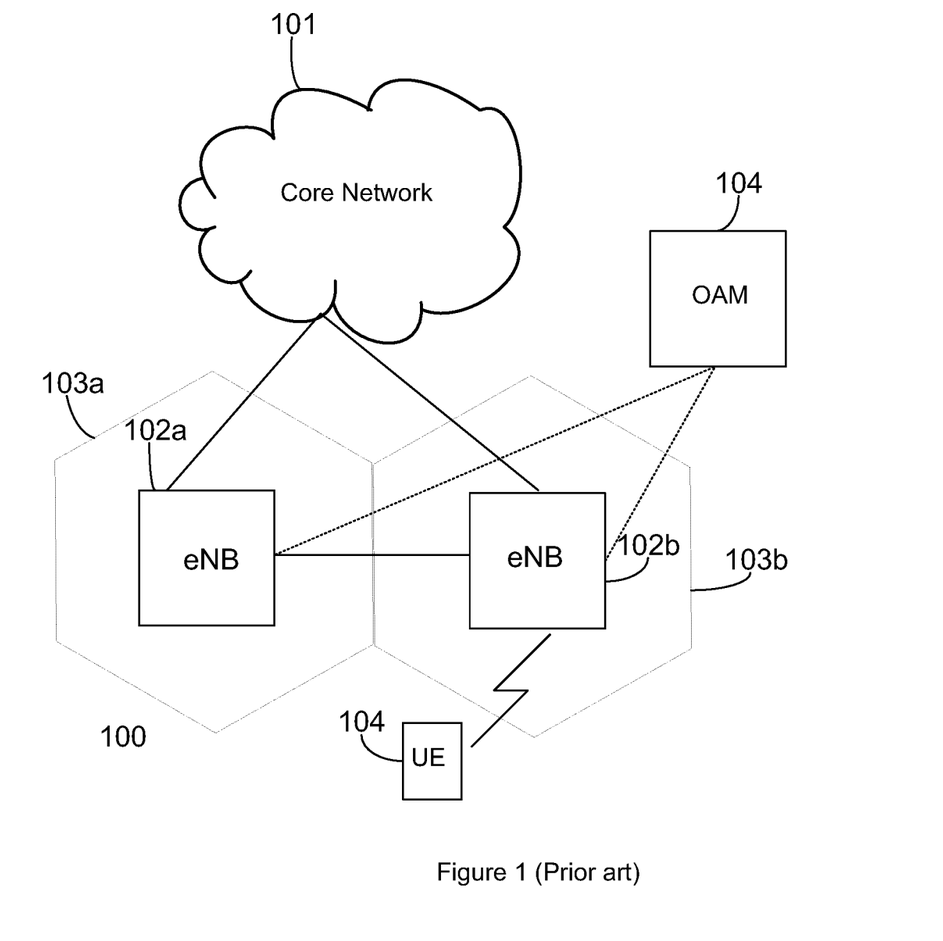
FIG. 1 is an overview of a communications network, according to the prior art.

FIG. 1 is a simplified illustration of a communications network 100, configured as an LTE network comprising a core network 101, connected to a plurality of eNBs 102a, 102b, serving a cell 103a, 103b, respectively, allowing UEs, here represented UE 104, connectivity via communication network 100. In addition, an Operations, Administrations and Maintenance (OAM) 103 is connected to the eNBs.

Figure 2:
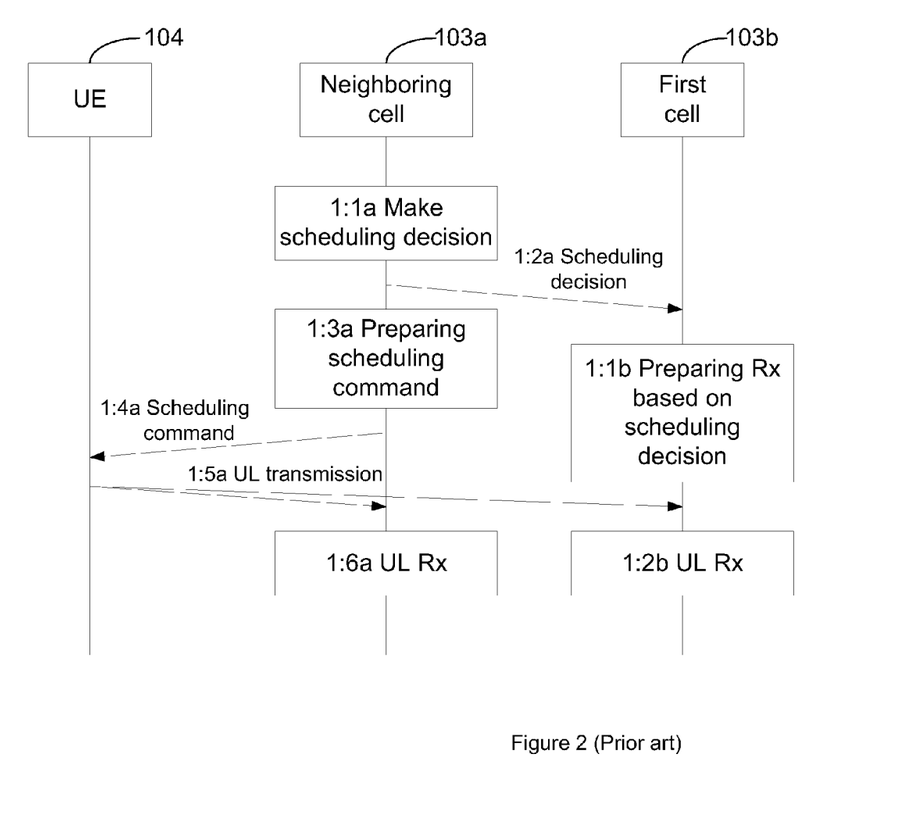
FIG. 2 is a signaling scheme illustrating how a first cell can acquire and scheduling decisions taken in a neighboring cell when preparing its UL receiver, according to the prior art.

FIG. 2 is a simplified illustration of a signaling scheme, which illustrates how scheduling information can be distributed between two adjacent cells, such as the ones described in FIG. 1, in order to enable a cell 103b, here referred to as the first cell, to acquire scheduling information originating from a neighboring cell 103a, and use this information to reduce the interference caused by the scheduled UL transmission of the neighboring cell 103a. More specifically, a scheduling decision is made for the neighboring cell 103a, as indicated in step 1:1a, before the scheduling decision is provided to the first cell 103a via any type of arrangement, interconnecting the respective cells, or more specifically the RBSs (Radio Base Stations) or eNBs serving the respective cells.

In step 1:3a the neighboring cell prepares a scheduling command on the basis of the preceding scheduling decision, and in a subsequent step 1:4a the neighboring cell transmits the scheduling command to a UE 104 served by the neighboring cell 103a, which thereby may receive the scheduling command and use it when transmitting in the UL to the neighboring cell 103a, as well as to other adjacent cells, here represented by the first cell 103b, as indicated in a next step 1:5a. Since the first cell 103b is connected to the neighboring cell 103a via a fixed connection, the acquired scheduling decision may be used by the first cell 103b, such that it is taken into consideration when preparing for UL reception at the first cell 103b, as indicated in step 1:1b, executed in another step 1:2b.

In order to enable distribution of scheduling information to adjacent cells there are a number of different approaches available. According to one embodiment, which is based on intra-RBS (Radio Base Station), inter-cell communication, inter-cell information is exchanged via a vendor specific solution. Such an implementation could be executed by backboard, by use of inter process communication, or by communication between software blocks/unit, dependent on the implementation. When applying such a solution, a signal can be combined between different cells or different sectors at the same cell. High hardware requirements at each RBS site and on the total base band processing capacity, will introduce higher processing requirements for the base band processor capacity of the RBS, and hence also higher component and development costs. If the RF (Radio Frequency) system is located in different places for different cells, an optical fiber or any other solution for providing a high capacity transport channel will be required, and in most cases very costly for the operator. A solution supporting different sections in one cell will also require high costs due to the requirement of setting up a high capacity transport channel, e.g. via an optical fiber solution, arranged between the RF system and the RBS, or between different RBS sites.

According to another embodiment, a high-capacity, low delay connection is instead provided between each associated RBS and baseband scheduler. Such a solution will however result in high deployment requirements at rollout for the operator, due to the fact that the operator will need to provide for geographically separated points connected with e.g. optical fiber.

For most operators there will be no backhaul to exchange scheduling information between the RBSs using this type of arrangements, and as a consequence, features, such as UL SIC, as well as other alternative ways of trying to diminish interference which rely on scheduling information of neighboring cells will not be executable at all.

SUMMARY

An object of the present disclosure is to address the problem mentioned above, and thus to provide an alternative solution to the ones disclosed above.

According to one aspect, an arrangement is provided which is capable of interacting with a first radio base station located in a first cell, where the arrangement comprises a processor, and a memory, where the memory is capable of storing instructions which when executed by the processor causes the processor to control a radio frequency unit associated with the first radio base station to receive scheduling information transmitted from a second radio base station located in a neighboring cell by listening to a downlink control channel; to decode the received scheduling information, and to provide the decoded scheduling information to an uplink receiver and/or an uplink scheduler associated with the first radio base station, thereby enabling for the uplink receiver and/or uplink scheduler to enhance its performance on the basis of the received scheduling information.

By allowing the radio base station to acquire scheduling information of neighboring cells via an air interface instead of via any fixed arrangement, such scheduling information may be used more extensively in various network architecture, including networks where corresponding fixed arrangements are very costly to provide.

According to one embodiment, the common downlink channel used for listening to scheduling information is the physical downlink control channel, PDCCH.

The processor may be configured to control the radio frequency unit to listen to the scheduling information via a separate antenna construction dedicated for receiving said scheduling information, where such an antenna construction may comprise a directive antenna.

The memory may be capable of storing instructions which when executed by the processor causes the processor to control the radio frequency unit such that it listens to the scheduling information when operating as a down link transmitter via a conventional antenna construction.

According to one embodiment, the arrangement may be configured to handle Time Division Duplex, TDD, communication, while according to another embodiment, the arrangement may instead be configured to handle Frequency Division Duplex, FDD, communication.

The memory may be capable of storing instructions which when executed by the processor causes the processor to control the radio frequency unit such that it listens to the scheduling information via the dedicated antenna construction, via a radio frequency path which is arranged separate from a radio frequency path connected to the conventional antenna construction.

According to another aspect, a method is also provided which is executed in a first radio base station located in a first cell for the purpose of acquiring scheduling information associated with a second radio base station located in a neighboring cell. The method comprises: listening, via an air interface, to scheduling information transmitted via a downlink control channel from the second radio base station; decoding the received scheduling information, and providing the decoded scheduling information to an uplink receiver and/or uplink scheduler associated with said radio base station, thereby enabling for the uplink receiver and/or uplink scheduler to enhance its performance on the basis of the received scheduling information.

According to one embodiment, listening to the scheduling information may be executed when the first radio base station is operating as a down link transmitter via a conventional antenna construction.

According to one embodiment, listening to the scheduling information may be executed via the dedicated antenna construction, via a radio frequency path which is separate from a radio frequency path connected to the conventional antenna construction.

BRIEF DESCRIPTION OF THE DRAWINGS

The present document will now be described in more detail by means of exemplary embodiment, with reference to the accompanying drawings, in which.

DETAILED DESCRIPTION

To overcome the deficiencies mentioned above, an arrangement is provided which enables a cell to listen to scheduling information, or more specifically to scheduling commands, transmitted from a neighboring cell, either by resuing most of the components of an existing antenna system, or via a separate antenna system, typically referred to as a sniffer antenna system, specifically dedicated for listening to scheduling information transmitted from the neighboring cell. Once the first cell has acquired the scheduling information it will be able to enhance its receiver performance by mitigating the interference from the neighboring cell, by way of making use of the scheduling commands acquired via the air, instead of having to rely on hardware based solutions for transmission of scheduling commands between adjacent cells.

The suggested method can be applied without requiring any amendments to the present standardization, and will also be implementable at relatively moderate costs, compared to alternative solutions.

Figure 3:
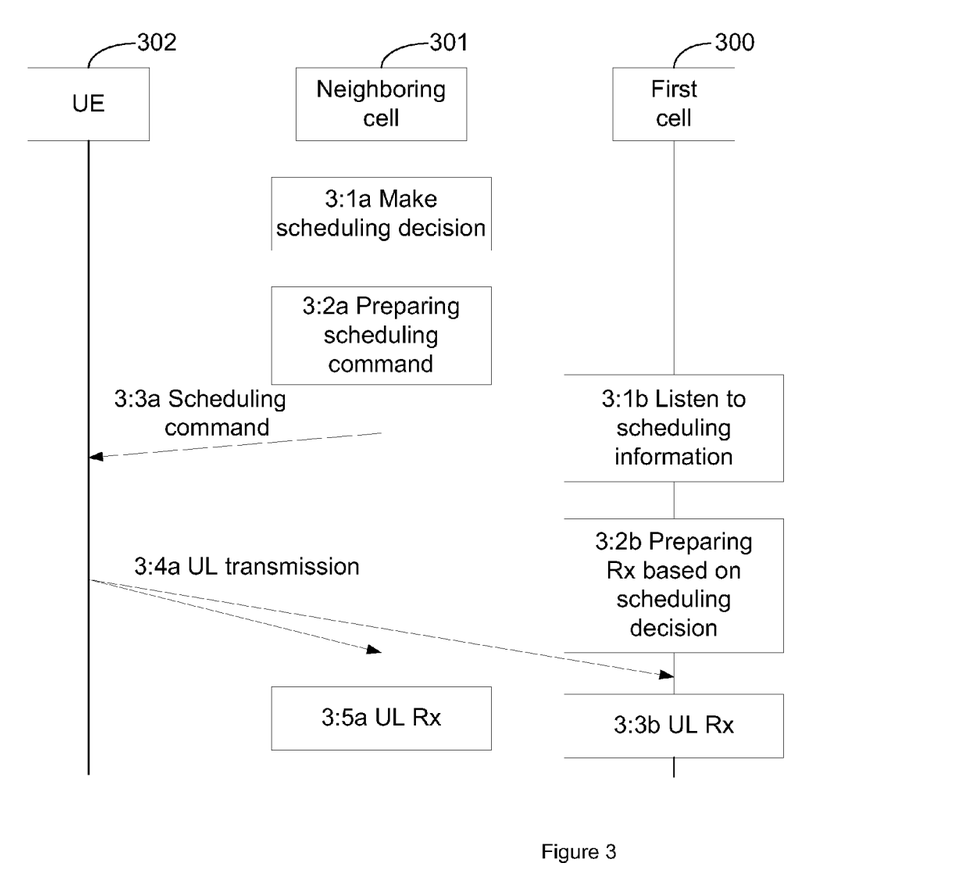
FIG. 3 is a signaling scheme illustrating an alternative way of acquiring scheduling information, according to one embodiment.

FIG. 3 is a signaling scheme, illustrating how the suggested method may be executed in a cell, here referred to as a first cell 300, configured to listen to a neighboring cell 301. In a first step 3:1*a*, the neighboring cell 301 makes a scheduling decision, and prepares a scheduling command, on the basis of the scheduling decision, as indicated in a subsequent step 3:2*a*. According to another step 3:3*a*, the serving cell then transmits the scheduling command, such that it can be received by a respective UE, here represented by UE 302, which may be any type of conventional UE.

By applying the method suggested in this document, adjacent cells, such as the first cell 300, will be able to acquire and make use of the scheduling information in the form of scheduling commands, transmitted from the neighboring cell 301, by listening to such information, as indicated in another step 3:1*b*. In a subsequent step 3:2*b* the first cell 300 prepares its associated receiver on the basis of the acquired scheduling information. Thereby, the first cell 300 will be able to enhance its receiver performance, by considering the scheduling information during the UL transmission, here expressed with step 3:3b.

Figure 4:
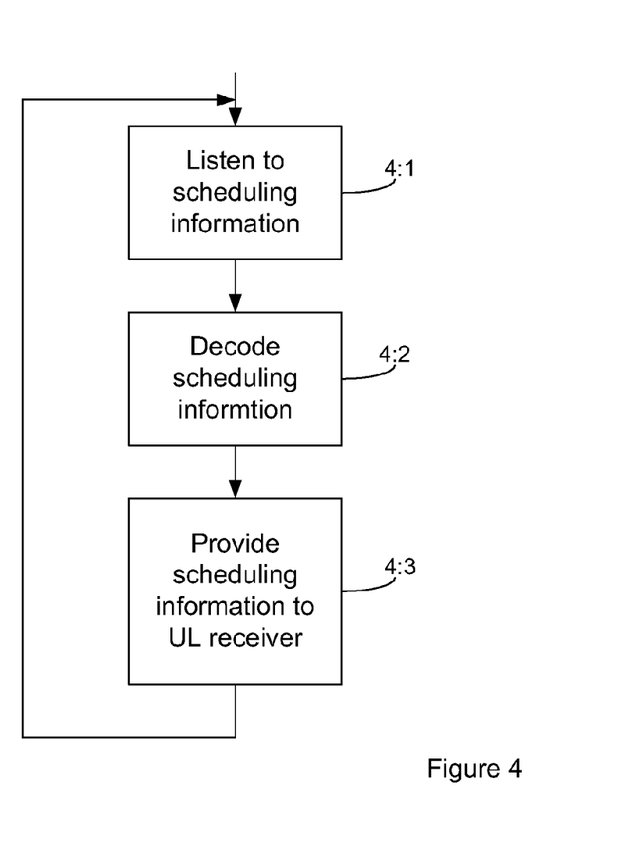
FIG. 4 is a flow chart describing a method executed at an arrangement of a cell for acquiring scheduling information from a neighboring cell.

The method mentioned above, when executed by an arrangement in a cell adjacent to a neighboring, serving cell, can be described according to the flow chart of FIG. 4, which describes successive steps which are typically repeated as long as the method is applied by the cell of an LTE network. Even though the suggested method may be applied only on demand, the method is typically applied by the cell on a permanent basis, such that it is continuously provided with updated scheduling information from the neighboring cell, and such that the neighboring cell can make use of the acquired scheduling information in any way possible for improving its UL receiver performance. As already mentioned above, there are various ways of make use of such information. In addition to using the scheduling information in association with applying UL SIC, mentioned above, access to this type of information from a neighboring cell can be used for improving channel estimation, as well as noise and interference estimation. However, since the actual use of the acquired scheduling information is out of scope of this document, those procedures will not be described in any further detail in this document.

In a first step 4:1, the arrangement of the cell listens to the scheduling information transmitted by the neighboring cell and recognize received scheduling information. Typically the arrangement listens to the scheduling information by listens to a downlink control channel, and more specifically the PDCCH (physical downlink control channel). In order to recognize relevant scheduling information, the cell initially may blind decode received scheduling information, e.g. by trying different RNTI for CRC check, where if the CRC check is found to be ok, the scheduling information is recognized. Such a blind decoding process may be further improved, e.g. by configuring the Operation, Administration and Maintenance (OAM) system to be able to detect, completely or partly, which RNTI that is used by the neighboring cell, thereby limiting the number of RNTIs to be interrogated during the blind decoding.

In a subsequent step 4:2, the arrangement decodes the received scheduling information, and in a subsequent step 4:3, the eNB prepares the scheduling information, by making it available to its UL receiver. Even though the example given above refers to an LTE network, it is to be understood that the described method can be applied on any telecommunications network which can be provided with an additional antenna, as will be described in further detail below.

Figure 5:
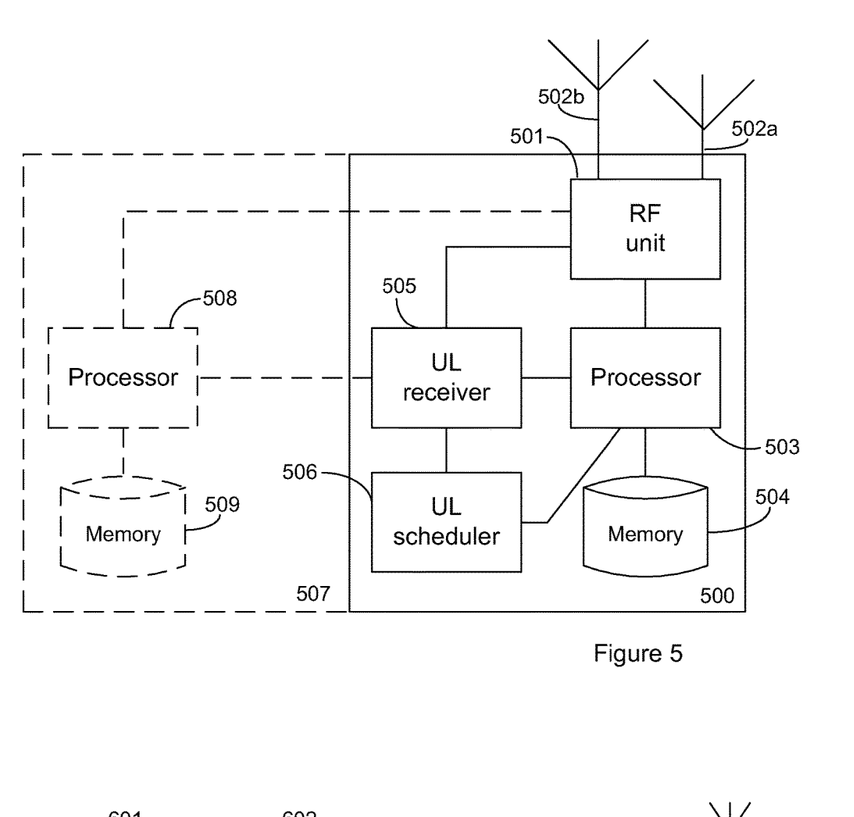
FIG. 5 is a simplified block scheme describing an arrangement capable of acquiring scheduling information from a neighboring cell, according to another embodiment, where the arrangement comprises a separate dedicated antenna construction.

An arrangement which is suitable for applying a method, such as the one suggested above may be arranged according to the simplified block scheme of FIG. 5, which illustrates functional entities typically comprised in a RBS or an eNB. Throughout this document RBSs are to include also eNBs as possible options. It is to be understood that even though an RBS and a eNB comprise more functional entities, such as e.g. DL (Downlink) receiver and DL scheduler, these are omitted from the figure for simplicity reasons, if not necessary for the understanding of the functionality described herein. The arrangement of FIG. 5 comprises an additional antenna 502b in addition to the conventional antenna used for conventional communication provided at the RBS/eNB, which has been provided to the RF unit 501 of the arrangement 500. The RF unit 501 is controllable from a processor 503 in a way which will be further described below. Typically, the processor 503 is configured to execute the method steps as described in FIG. 4 above, by executing instructions stored in a memory 504 and forming a computer program.

The computer program may be in source code form, object code form, or in some intermediate form, and it may be stored in some sort of carrier, which may be any entity or device capable of carrying the program. Such carriers include e.g. a record medium, computer memory, read-only memory, electrical carrier signal or a telecommunications signal.

In addition to controlling an UL receiver 505 of the RBS/eNB, the processor 503 can control reception of scheduling information and provide the received information to the UL receiver 505. As indicated in the figure, the UL receiver 505 is connected to an UL scheduler 506, so that, depending on the implementation, the scheduling information can be used by the UL receiver and/or the UL scheduler 506.

The described embodiment implies that the processor and memory normally used by the RBS/eNB is configured to perform also the tasks described above, and thus, that arrangement 500 forms part of the RBS/eNB. However, according to an alternative embodiment, the feature for listening to scheduling information may be implemented as a separate arrangement 507, which is connected to a conventional RBS/eNB. In the latter case, the separate arrangement 507 may comprise a separate processor 508, which typically will be dedicated also to other additional tasks, and/or a separate memory 509.

In a typical embodiment, such as the one illustrated in FIG. 5, the additional antenna construction 502b is made higher than the conventional antenna 502a, and/or is directed in a direction which differs from the direction of the conventional antenna, in order to reduce the interference from the conventional antenna construction 502a.

According to another embodiment, which may be used alone or in combination with using a higher antenna, the dedicated antenna construction 502b may be arranged as an antenna construction which is shielded towards the transmitting antenna of the neighboring cell.

According to yet another embodiment, higher MCL (minimum coupling loss) requirements may be applied between the two antennas by placing the listening antenna perpendicular to the conventional transmitting antenna and/or by increasing the distance between the listening antenna and the conventional antenna. Yet another improvement may be achieved by adding a shield to the listening antenna.

According to a further embodiment, self interference cancellation may be applied in the receiver when operating as a TDD receiver.

The RF unit 501 may be configured according to any of a number of alternative embodiments, in order to be able to handle interference caused from the conventional communication handled by the eNB.

The RF unit 501 of FIG. 5 will now be described below according to two different embodiments with reference to FIGS. 6 and 7, respectively.

Figure 6:
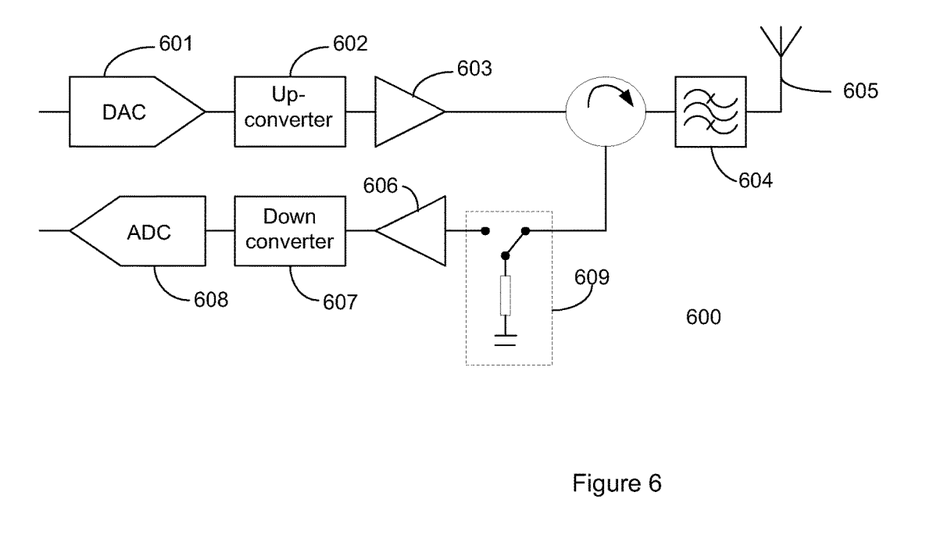
FIG. 6 is an RF unit operable according to the prior art.

FIG. 6, is a simplified illustration of an RF unit 600, arranged according to the prior art, suitable for handling TDD (Time Division Duplex) traffic. According to FIG. 6, a DAC (Digital to Analog Converter) 601, an Up-converter 602 and a PA (Power Amplifier) 603 are arranged to provide for transmission of time slots via a filter 604 and an antenna construction 605 in the DL, while another branch, comprising a LNA (Low Noise Amplifier) 606, a Down converter 607 and a ADC (Analog to Digital Converter) 608 is configured to handle UL time slots received via the antenna construction 605, depending on the state of a high speed switch 609, which is configured to open/close the UL receiver branch, depending on the TDD UL and DL configuration.

Figure 7:
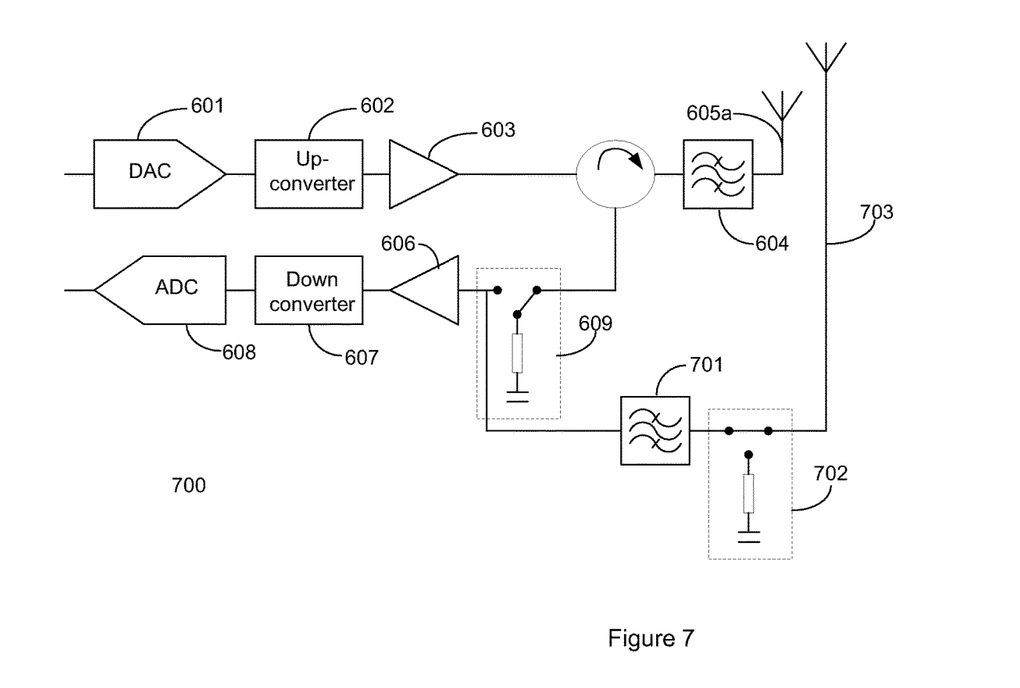
FIG. 7 is an RF unit according to a first embodiment for listening to scheduling information transmitted from a neighboring RBS.

FIG. 7 is another simplified illustration of another RF unit 700, which is suitable for handling TDD, which comprise the same functional units as the embodiment of FIG. 6 but which has been adapted to be able to also listening to scheduling information from a neighboring cell. In addition to the conventional components described above with reference to FIG. 6, the embodiment of FIG. 7 comprises a further branch comprising a separate filter 701, a second switch high speed switch 702 and a separate dedicated antenna construction 703, where the mentioned, additional branch is operable when switch 702 is switching on the additional branch, as indicated in FIG. 7. The latter situation is applied when the FR unit 700 is in UL mode, i.e. when operating in normal TDD UL receiver mode. During that time the dedicated antenna construction 703 will not be in use, while during DL operation, switch 702 is closing its branch, such that the dedicated antenna 703 will be able to listen to scheduling information while the conventional antenna 605a is used for conventional DL transmission.

According to a first embodiment switch 609 may be configured to operate according to a predefined configuration, such that e.g. in a 10 ms interval, the $2^{nd}$, $3^{rd}$, $7^{th}$ and $8^{th}$ ms are UL time slices when switch 702 is connected, i.e. branch 601-603 is active, while at remaining times, the switch 702 is disconnected and switch 609 is connected, i.e. branch 606-608 is active, listening to scheduling information. This procedure may be repeated every 10 ms, until a new UL/DL configuration is recognized by the processor.

According to another embodiment, switch operation information may be sent beforehand, such that e.g. in 1 ms, the RF unit receive information about how to operate switch 602 and 509 in the $11^{th}$ ms, in the $2^{nd}$ ms, RF unit receive information about how to operate the switch in the $12^{th}$ ms, and so on.

Figure 8:
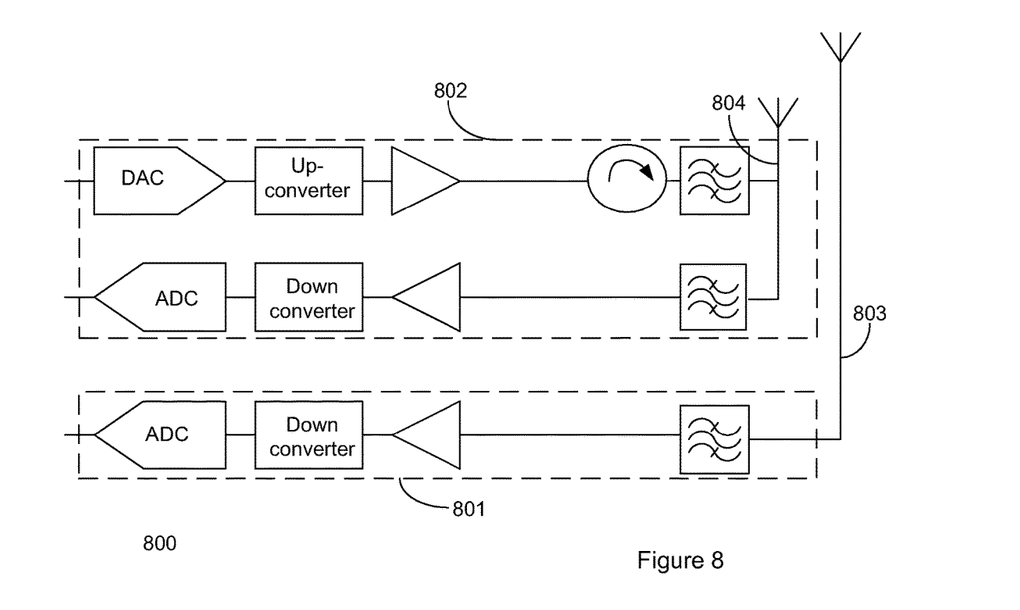
FIG. 8 is an RF unit according to a second embodiment for listening to scheduling information transmitted from a neighboring RBS.

FIG. 8 is yet another illustration of an RF unit 800. However, RF unit 800 is configured such that it is capable of handling FDD (Frequency Division Duplex) traffic, where the RF unit 800 comprises a separate RF receiver listening path 801, including a dedicated antenna construction 803, in addition to a conventional UL/DL path 802, including a conventional antenna construction 804. Thereby, in an FDD scenario, the described arrangement 800 comprises separate hardware which is capable of handling conventional communication and sniffing in parallel to handling conventional UL and DL communication. In resemblance to FIGS. 6 and 7, the embodiment of FIG. 8 comprises up- and down-converters, DAC, ADCA, PA and LNA which are adapted for handling FDD traffic, accordingly.

A simplified illustration of a typical a system architecture 900, which may be applicable e.g. in an LTE HetNet scenario, will now be described with reference to FIG. 9. The system architecture comprise a Pico RBS 901, which may be configured according to any of the arrangements described above, including any of the RF configurations also described above. Here, a conventional antenna construction 902 is operating as a transmitting antenna, when operating for a transmitter 903, typically forming part of a conventional transceiver, while an arrangement, here referred to as listening arrangement 904, comprising an RF arrangement according to any of the embodiments described above, is configured to listen to scheduling information transmitted from another neighboring RBS, here referred to as macro RBS 905, serving a neighboring cell, via a dedicated antenna 906, here arranged as a directional antenna.

Figure 9:
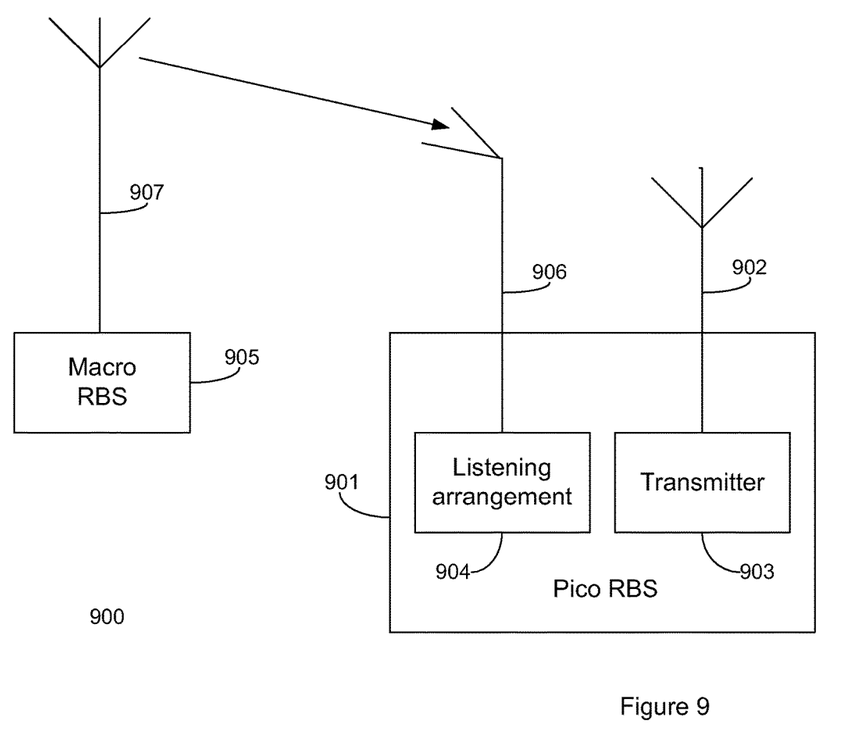
FIG. 9 is a system architecture according to one embodiment for listening to scheduling information.
Figure 10:
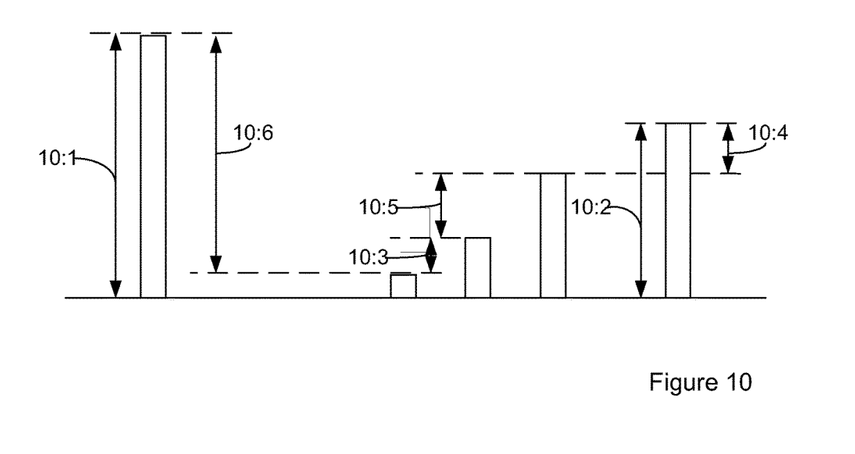
FIG. 10 is an illustration of a link budget for a system architecture according to FIG. 9, according to one embodiment.

FIG. 10 is an example illustrating path loss between the different antenna systems of the system configuration illustrated with FIG. 9, showing that adequate system performance can be obtained when listening to scheduling information in parallel to performing conventional transceiver functionality, at moderate costs, as long as sufficient isolation between the sniffing and conventional communication is obtained.

In FIG. 10, 10:1 is illustrating the transmitting power of the macro RBS 905 of FIG. 9, which present typically equals 40 W, i.e. 46 dbm. 10:2 is illustrating the transmitting power of the Pico RBS 901, which here is 1 W, which equals 30 dbm. While the minimum requirement for a local area RBS, as indicated in chapter 6:2 of 3GPP 36.104, is 24 dbm, a margin of 6 dbm is used in the present example. The antenna gain of both the Macro and dedicated Pico antenna 907, 906 is here assumed to be 18 dbi, while the dedicated shielded directive antenna gain is assumed to be 23 dbi. By applying a shielded directive antenna more receiver antenna gain to the macro RBS is obtained. In the present case this result in additional antenna gain of 5 db (23 dbi-18 dbi), as indicated with 10:3. In addition, more directivity will mean higher isolation between the conventional Pico RBS antenna construction and the dedicated antenna construction. Normally at least 30 db isolation can be expected for a co-site antenna. In the present setting, isolation between the antennas of 45 db, as illustrated with 10:4 can be expected. Typically, for a HetNet scenario, the antenna of the Macro cell is much higher than the conventional Pico cell antenna. Due to low transmitting power of the Pico cell, which may typically be 10 times lower than the transmitting power of the Macro cell, also result in lower interference.

According to chapter 7.6.1.1. of 3GPP spec. 36.104 a blocking index of 52.5 db dynamic range should be supported. In the present example we therefore assume a dynamic range for the blocking index of 65 db, as indicated with 10:5.

To summarize, a max path loss between the Macro RBS and the directive antenna arrangement is therefore: 46 dbm−(30 dbm−45 db−65 db−5 db)=131 db. Consequently, the described example shows that adequate isolation between the neighboring antenna and the dedicated listening antenna can be obtained.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. An apparatus configured to interact with a first radio base station located in a first cell, the apparatus comprising:
   a processor, and
   a memory, storing computer program instructions that, when executed by the processor cause the processor to:
      control a radio frequency unit associated with the first radio base station to receive scheduling information transmitted to one or more user equipments from a second radio base station located in a neighboring cell by listening to a downlink control channel;
      decode the received scheduling information; and
      provide the decoded scheduling information to an uplink receiver and/or an uplink scheduler associated with said first radio base station, thereby enabling the uplink receiver and/or uplink scheduler to enhance its performance on the basis of the received scheduling information.

2. The apparatus of claim 1, wherein the downlink control channel is a physical downlink control channel (PDCCH).

3. The apparatus of claim 1, wherein the processor is configured to control the radio frequency unit to listen to the scheduling information via a separate antenna dedicated for receiving said scheduling information.

4. The apparatus of claim 3, wherein the dedicated antenna comprises a directive antenna.

5. The apparatus of claim 3, wherein the processor is configured to handle Time Division Duplex (TDD) communication.

6. The apparatus of claim 3, wherein the memory is stores further instructions that, when executed by the processor, causes the processor to control the radio frequency unit so that it listens to the scheduling information when operating as a down link transmitter via an antenna used for uplink and downlink communications.

7. The apparatus of claim 3, wherein the processor is configured to handle Frequency Division Duplex (FDD) communication.

8. The apparatus of claim 3, wherein the memory stores further instructions that, when executed by the processor, cause the processor to control the radio frequency unit so that it listens to the scheduling information via the dedicated antenna, via a radio frequency circuit path that is arranged separately from a radio frequency circuit path connected to an antenna used for uplink and downlink communications.

9. A method, executed in a first radio base station located in a first cell, for acquiring scheduling information associated with a second radio base station located in a neighboring cell, the method comprising:
  listening, via an air interface, to scheduling information transmitted to one or more user equipments via a downlink control channel from the second radio base station;
  decoding the received scheduling information; and
  providing the decoded scheduling information to an uplink receiver and/or uplink scheduler associated with said radio base station, thereby enabling the uplink receiver and/or uplink scheduler to enhance its performance on the basis of the received scheduling information.

10. The method of claim 9, wherein the downlink control channel is a physical downlink control channel (PDCCH).

11. The method of claim 9, wherein the scheduling information is transmitted via Time Division Duplex (TDD).

12. The method of claim 11, wherein listening to the scheduling information is executed when the first radio base station is operating as a down link transmitter via an antenna used for uplink and downlink communications.

13. The method of claim 9, wherein the scheduling information is transmitted via Frequency Division Duplex (FDD).

14. The method of claim 13, wherein listening to the scheduling information is executed via a dedicated antenna, via a radio frequency circuit path that is separate from a radio frequency circuit path connected to an antenna used for uplink and downlink communications.

* * * * *